US006991097B1

(12) United States Patent
Sheehan

(10) Patent No.: US 6,991,097 B1
(45) Date of Patent: Jan. 31, 2006

(54) KITS AND METHODS THAT FACILITATE FLEXIBLE MANUFACTURE

(75) Inventor: Joanne Sheehan, North Easton, MA (US)

(73) Assignee: Network Engines, Inc., Canton, MA (US)

( * ) Notice: Subject to any disclaimer, the term of this patent is extended or adjusted under 35 U.S.C. 154(b) by 6 days.

(21) Appl. No.: 10/700,350

(22) Filed: Nov. 3, 2003

Related U.S. Application Data

(60) Provisional application No. 60/423,126, filed on Nov. 1, 2002.

(51) Int. Cl.
*B65D 69/00* (2006.01)
*B65D 1/34* (2006.01)
*B65D 85/62* (2006.01)

(52) U.S. Cl. ............... 206/223; 206/576; 206/564; 206/499

(58) Field of Classification Search ........... 206/575, 206/576, 562–565, 223, 231, 569, 570, 499, 206/582, 557, 558, 591–593, 484, 320, 486, 206/503, 706, 719, 722, 723, 725; 414/267, 414/332
See application file for complete search history.

(56) References Cited

U.S. PATENT DOCUMENTS

| | | | |
|---|---|---|---|
| 3,191,791 A * | 6/1965 | Jackson | 206/558 |
| 3,802,555 A * | 4/1974 | Grasty et al. | 206/572 |
| 4,231,901 A * | 11/1980 | Berbeco | 206/523 |
| 4,473,935 A * | 10/1984 | Tatsuura et al. | 206/499 |
| 4,787,801 A * | 11/1988 | Ahlsen et al. | 414/222.03 |
| 4,821,197 A * | 4/1989 | Kenik et al. | 414/273 |
| 4,887,717 A * | 12/1989 | Secrest, Jr. | 206/575 |
| 5,120,190 A * | 6/1992 | Smith et al. | 414/807 |
| 5,353,495 A * | 10/1994 | Terabayashi et al. | 414/222.13 |
| 6,056,121 A * | 5/2000 | Olson | 206/577 |
| 6,138,858 A * | 10/2000 | Tu | 206/716 |
| 6,236,901 B1 * | 5/2001 | Goss | 700/95 |
| 6,516,242 B1 * | 2/2003 | Brown | 700/216 |

* cited by examiner

*Primary Examiner*—David T. Fidei
*Assistant Examiner*—J. Gregory Pickett
(74) *Attorney, Agent, or Firm*—David J. Powsner; Nutter McClennen & Fish LLP

(57) ABSTRACT

The invention provides, inter alia, kits and methods for improved manufacture and, in particular, for improved fixed and flexible manufacture. The improvements provide templates having cavities, silhouettes, impressions, contours, and/or profiles (collectively, "cavities") that fit and correspond to parts at each stage of parts picking and/or assembly. For example, a kit can have (and a method according to the invention can use) a first template with cavities adapted to hold parts used in a first stage of computer manufacture; a second template with cavities adapted to hold parts used in a second stage of computer manufacture; and so forth. Alternatively, or in addition, the templates can hold parts gathered/or to be gathered in different phases of parts picking—for example, the first template can have cavities adapted to hold parts gathered in a first stage of picking; a second template can have cavities adapted to hold parts gathered in a second stage of picking; and so forth.

7 Claims, 5 Drawing Sheets

KITS AND METHODS THAT FACILITATE FLEXIBLE MANUFACTURE

FIELD OF THE INVENTION

This Application claims the benefit of priority of U.S. Provisional Application 60/423,126 filed Nov. 1, 2002, the teachings of which are incorporated herein by reference. The present invention relates to methods and kits to facilitate manufacture of computers, electronics and other multi-component assemblies.

BACKGROUND OF THE INVENTION

The assembly line remains a conventional basis of manufacturing. A product being assembled moves along the line from station to station. Workers at the stations add parts to the overall assembly (or to a sub-assembly) as the piece moves past them. The process is referred to as fixed if the same part or parts are added at each station.

Changes in customer demand have resulted in at least a partial shift toward flexible manufacturing, where at each station of the line the parts added to the assembly (or sub-assembly) vary. This facilitates manufacture of build-to-order products, such as computers. For example, the same assembly line can be used to produce a workstation having an extra-powerful processor, followed by one having a conventional processor but extra memory. To achieve this, a pick list can be generated as each new order is received. This serves as a guide to stock room personnel in gathering parts that will be used during assembly. And it may serve as a guide to workers on the line who assemble the order.

Flexible manufacturing can be inefficient. Pick lists may be generated or filled in a haphazard, error-prone manner. Assembly line workers may ignore order details and, simply, try to "use up" all parts presented to them from the stock room. Either way, assembly is slowed and quality degraded. The significance of these problems is heightened by today's marketplace, which demands high mix, low volume lines that produce with high yields. The complexity of the underlying products only worsens the issue.

There is thus a need for improved methods and apparatus for flexible and fixed manufacture. Such is an object of the invention. Another object of the invention is to provide such manufacture methods and apparatus that improve the cost, quality, repeatability, and cycle time of manufacture. Yet, another object is to provide such manufacture methods and apparatus that so improve the parts picking and assembly phases of manufacture. A still further object is to provide such manufacture methods and apparatus that facilitate the manufacture of complex high mix, low volume product lines.

SUMMARY OF THE INVENTION

The foregoing are among the objects attained by the invention which provides, inter alia, kits and methods for improved manufacture and, in particular, for improved fixed and flexible manufacture. The improvements provide (or utilize, in the case of methods) templates having cavities, silhouettes, impressions, contours, profiles (collectively, "cavities") that fit and correspond to parts at each stage of parts picking and/or assembly.

By way of example, a kit according to one aspect of the invention can have (and a method according to the invention can use) a first template with cavities adapted to hold parts used in a first stage of computer manufacture; a second template with cavities adapted to hold parts used in a second stage of computer manufacture; and so forth. Alternatively, or in addition, the templates can hold parts gathered/or to be gathered in different phases of parts picking—for example, the first template can have cavities adapted to hold parts gathered in a first stage of picking; a second template can have cavities adapted to hold parts gathered in a second stage of picking; and so forth.

Related aspects of the invention provide kits and methods as above in which multiple templates are physically arranged or ordered in the sequence in which they will be used in manufacture or picking. Thus, for example, the templates can be stacked on one another such that the stock room personnel fill the topmost template first and/or, correspondingly, such that the assembly line workers use parts from the top-most template first; the stock room personnel fill the second topmost template second and/or, correspondingly, assembly line workers use parts from that template second; and so forth.

By way of example, a kit of multiple templates according to the invention can be used to facilitate parts picking and assembly in the flexible manufacture of computers. For each computer assembly, templates are assembled in the order with which the underlying parts are to be picked and/or assembled. The filled templates (i.e., templates with their attendant parts inserted) can be stacked and routed to the assembly line, for example, in a box, with a bottom-most template that holds a chassis cover that is to be used in a last stage of manufacture; a middle template that holds a set of power supplies, fan assemblies, drives, and miscellaneous components to be used in a second-to-last stage of manufacture; and a top template that holds set of circuit boards, processors, memory, and heat sinks to be used in a second stage of manufacture, as well as a chassis base and associated accessories to be used in a first stage of manufacture.

Further aspects of the invention provide products (e.g., computers) manufactured according to the processes and using the templates described above.

BRIEF DESCRIPTION OF THE DRAWINGS

A more complete understanding of these and other aspects of the invention may be attained by reference to the detailed description that follows and the drawings, in which.

DETAILED DESCRIPTION OF THE INVENTION

Figure 1:
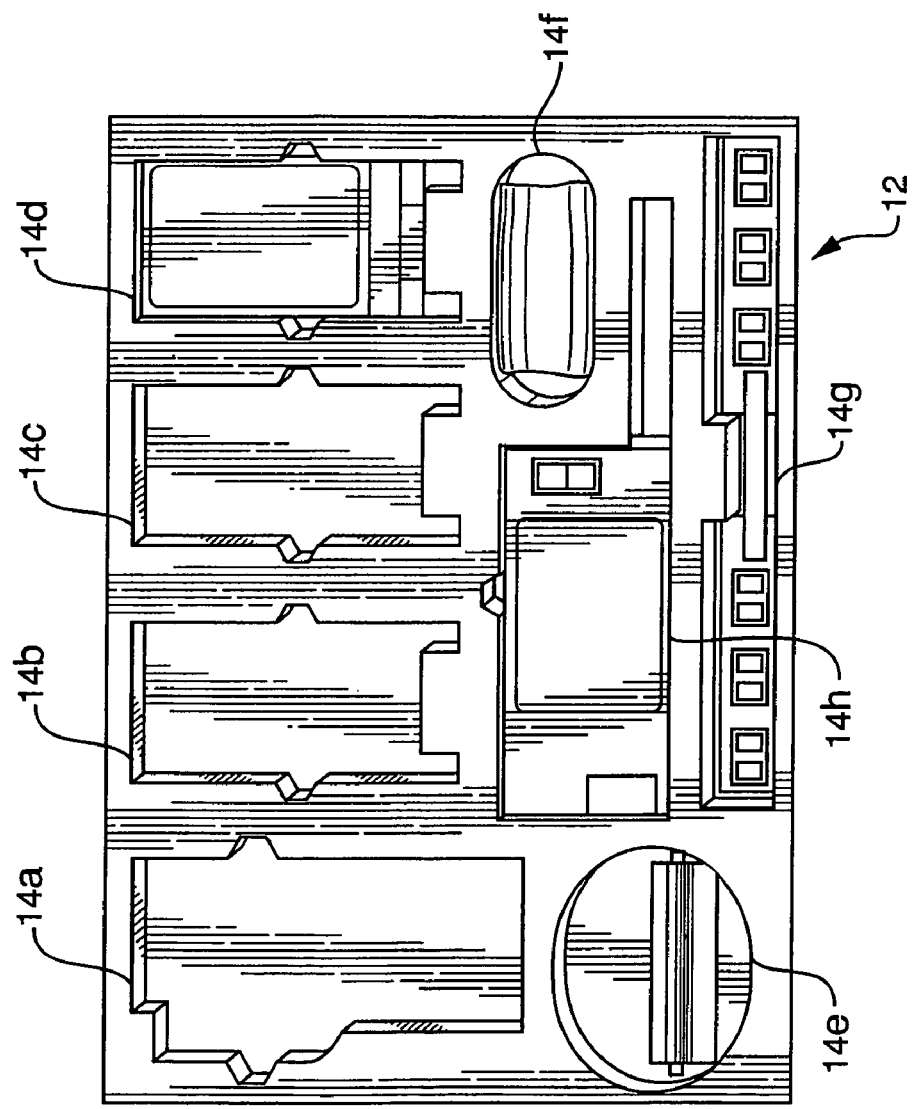
FIG. 1 illustrates a template used in a kit according to one embodiment.

FIG. 1 depicts a template 12 used in a kit according to the invention configured to facilitate the manufacture of a personal computer, work station, or other such digital processing apparatus. Of course, it will be appreciated that such a template can be used in connection with the manufacture of other goods. The illustrated template 12 is formed from a conductive foam. However, it will be apparent to those having ordinary skill in the art that the template 12 can be formed from other materials, e.g., cardboard, metal, ceramics, and so forth.

The template 12 has a rectangular shape (though other shapes can be used) that is sized to include cavities 14 that fit and correspond to parts in a specified stage of parts picking and/or assembly of a product, here, a computer. In the illustration, some of those cavities (to wit, 14d–4g) are partially filled to illustrate how the template is used. Instead of cavities, the template 12 can be configured with outlines, silhouettes, impressions, contours, profiles, containers, and other forms that likewise fit and/or correspond to the parts.

The cavities 14 can be arranged on the template in the order in which the corresponding parts are filled and/or used during the specified stage of picking and/or assembly. Alternatively, the cavities can be arranged for fit on the template, to ease part insertion and removal, or otherwise. Moreover, the cavities can be arranged to fit the corresponding parts exactly, approximately or loosely. An example of the former is cavity 14a; the latter, cavities 14e and 14f. Moreover, some cavities may be configured to hold multiple parts, odd-shaped parts, and so forth.

The illustrated template 12 facilitates that stage of parts picking or assembly with which the template is associated. By way of example, stock room personnel may work from an associated pick list (not shown) to fill the template. The personnel are guided by cavity 14 shapes as to which parts are required. If a part does not fit in a cavity (or it fits only in a cavity that is already filled), this alerts the personnel that the part may be extraneous. Alternatively, if a cavity remains unfilled after the list is completed, a part may have been missed. In this latter regard, templates may be designed so that some cavities are only occasionally filled, while others are always filled.

It is thus seen that the template 12 not only hold parts being picked for use in assembly, but it also serves as a check during the picking process. Moreover, stock room personnel can pre-fill at least portions of the templates during down time. Parts so stored are less likely to be damaged than, for example, parts retained in bulk storage. Requiring that parts be placed in the cavities, further, serves as a reminder to stock room personnel to remove unnecessary packaging that would otherwise delay assemblers.

Figure 2:
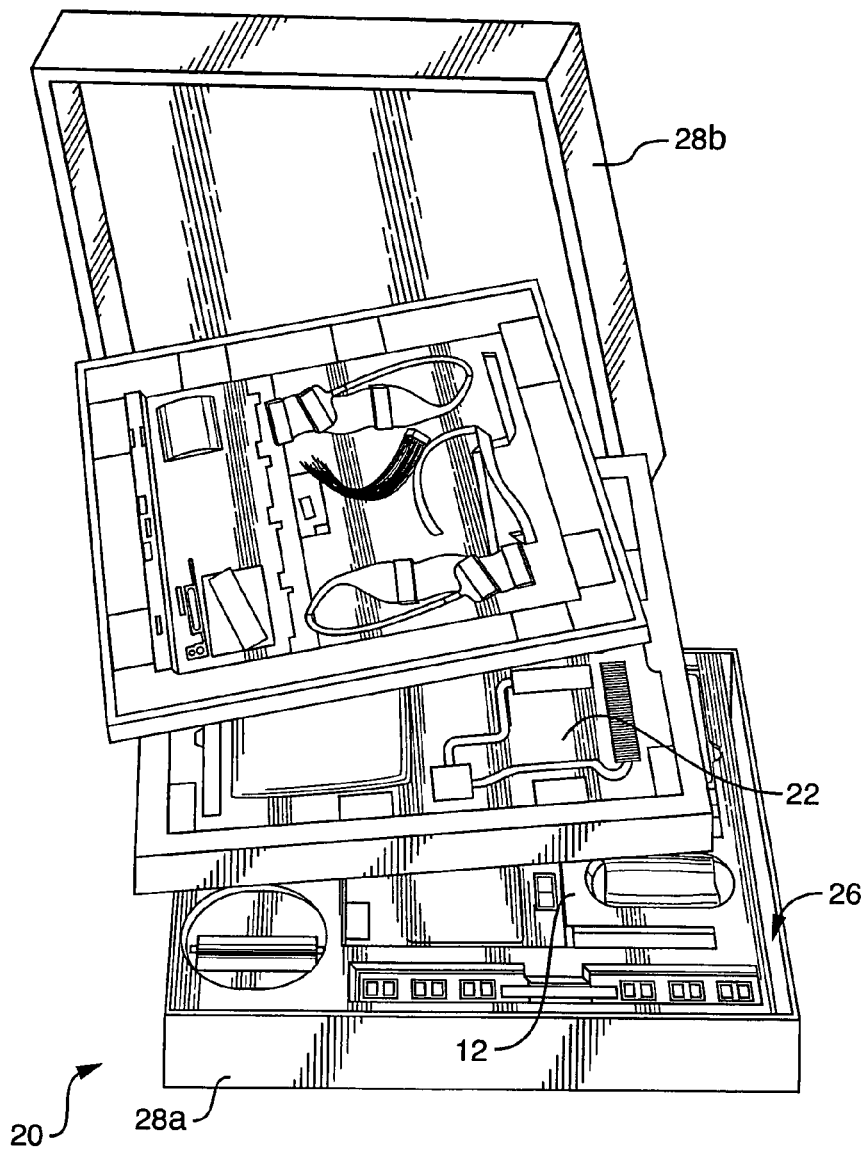
FIG. 2 illustrates stacked templates used in a kit according to one embodiment.

Regardless of whether used to facilitate parts picking, the template 12 can be one of several used to facilitate picking or assembly for an entire product. FIG. 2 depicts that template 12, along with two other templates, 22, 26 used in a kit 20 according to one practice of the invention to facilitate the manufacture of computers—in this case, 1U-sized computers. Of course, greater or fewer templates can be configured to facilitate such manufacture, or that of any other computer, electronic article or other article of manufacture. The kit 20 also includes a box 28a and cover 28b. These may be formed of conductive plastic but, in general, it can be formed from any material suitable for holding electronic manufactures.

The illustrated templates 12, 22, 26 are preferably stacked in the box 28a based on the order in which the parts they contain are picked—and, still more preferably—on the order in which those parts are used in assembly. Thus, the parts in template 22 are used during first and second stages of manufacture; those in template 12, during a third stage; and those in template 26 during a final stage. The templates 12, 22, 26 are thus stacked in such an order as to facilitate assembly of the computer. Of course, those skilled in the art will appreciate that the templates could be stacked in some other order, e.g., one based on priority with which the parts must be inspected, or so forth.

Figure 3:
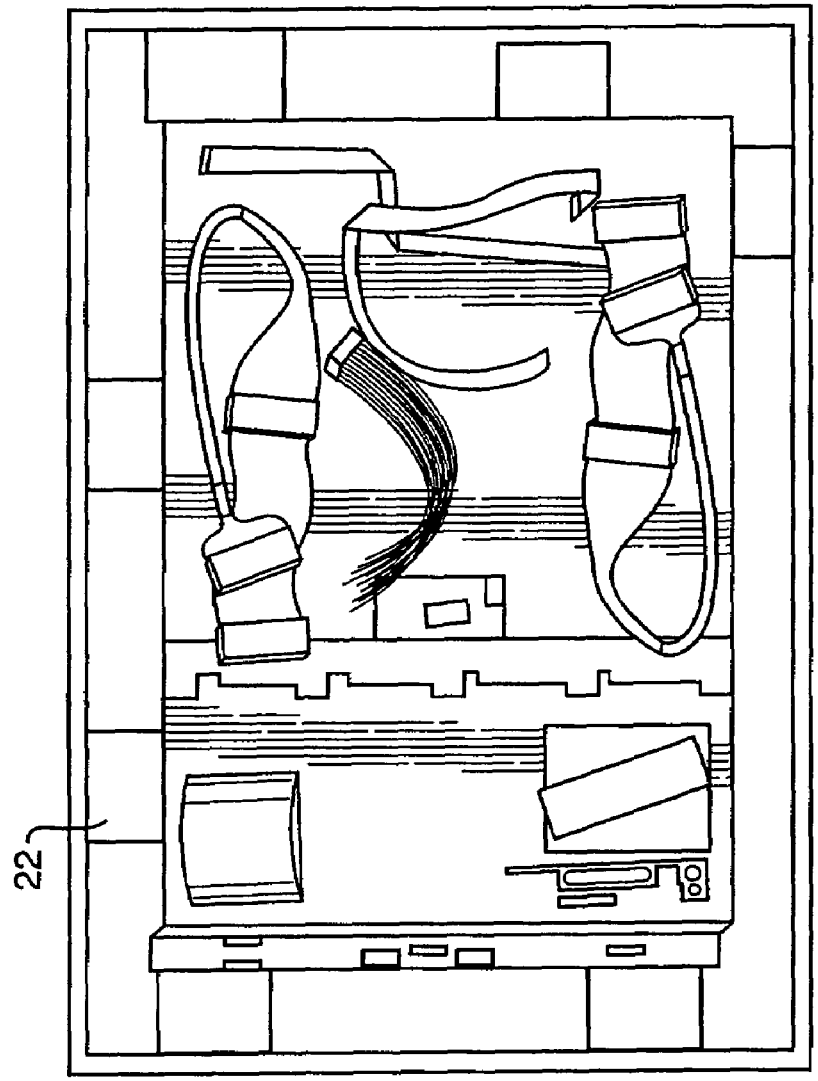
FIGS. 3–5 depict in greater detail the templates contained in the kit of FIG. 2.
Figure 4:
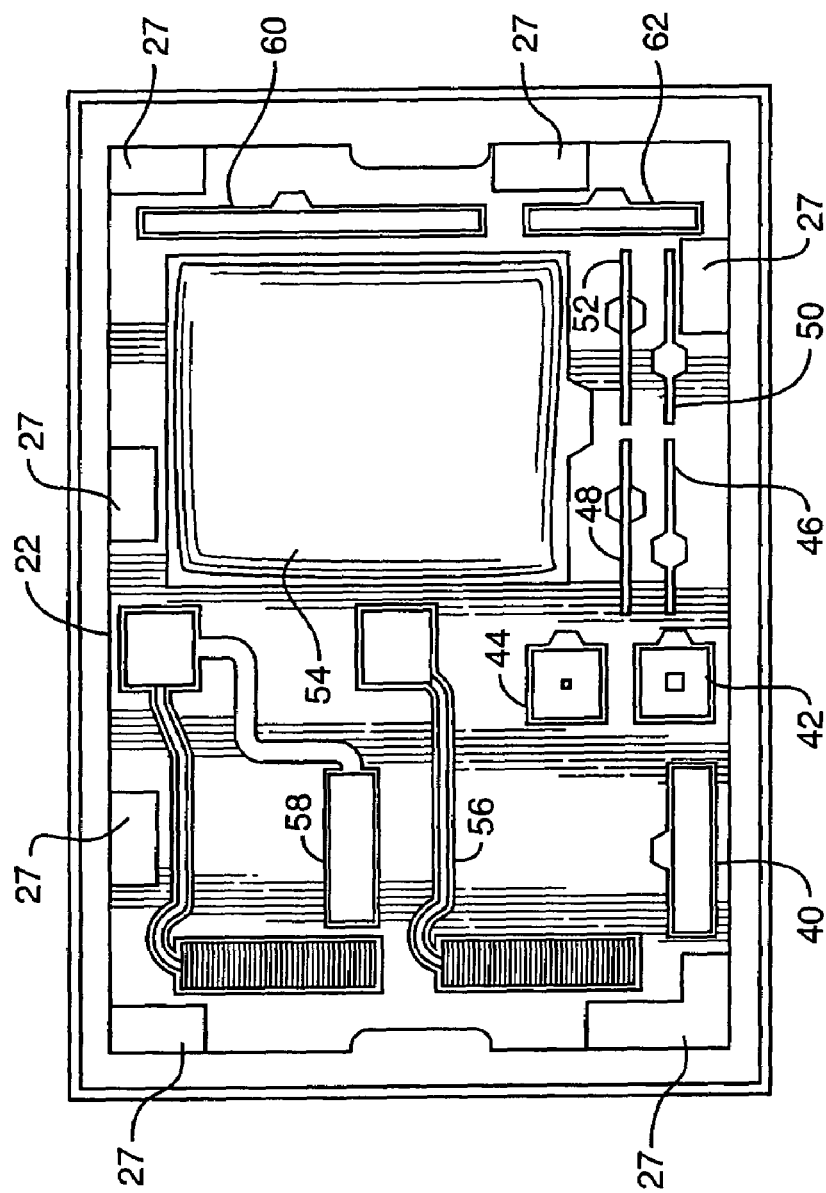
Figure 5:
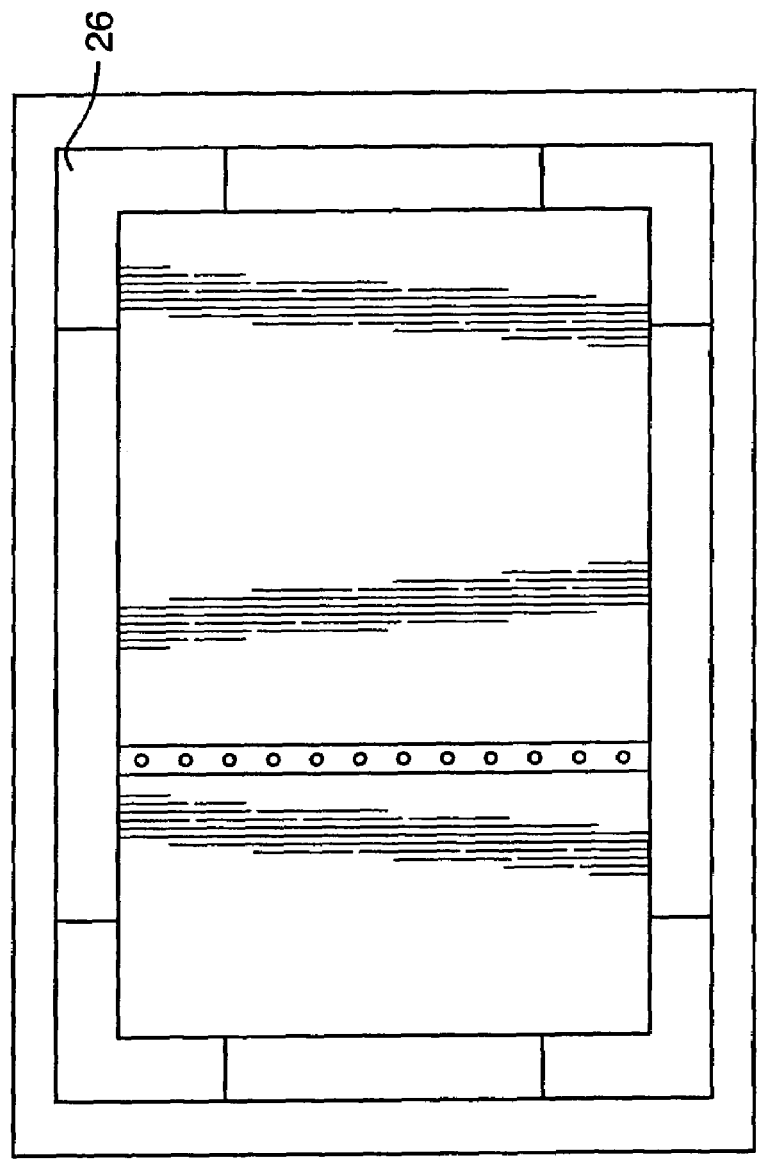

FIGS. 3–5 show the templates in more detail. Like template 12, discussed above, templates 22 and 26 are each formed with having cavities silhouettes, impressions, contours, profiles (again, collectively, "cavities") for the parts at respective stages of manufacture. And, as above, they are preferably formed of conductive foam, though other materials can be used as well or in addition. The illustrated templates are shown partially or completely filled with parts, as will be readily evident on inspection of the drawings.

Referring to FIG. 3, the top template 22 has cavities adapted to hold a computer chassis bottom and associated accessories used in a first stage of manufacture. While some of those accessories may be simply taped to or "thrown in with" the chassis bottom, as shown in FIG. 3, cavities (not shown) may be supplied for the other accessories used in that first stage.

The template 22 also has cavities adapted to hold parts used in a second stage of manufacture, to wit, circuit boards, processors, memory, and heat pipes. These are disposed beneath the cavity that is formed for the chassis bottom. Those other cavities are best viewed in FIG. 4, which shows template 22 with the bottom chassis removed.

Specifically, template 22 includes cavities 40–60 adapted to fit circuit boards (e.g., multilayer boards), processors, memory, and heat sinks (e.g. heat pipes) used in the second stage of manufacture. Illustrated cavity 54 holds a circuit board having an ESD safe wrapper.

The template 22 includes supports 27 along the outer edge to form a large upper cavity in which the chassis bottom is disposed. Although the supports 27 are shown to be discontinuous blocks, it is understood that the supports 27 can be otherwise configured, for example, as a single flange along the template perimeter.

Referring back to FIGS. 1 and 2, template 12 is the second topmost plate in the kit 20. Its cavities 14 holding parts used in the third stage of manufacture, namely, power supplies, fan assemblies, drives, and miscellaneous components.

Referring to FIG. 5, template 26 is the bottom template in the kit 20. Its cavities hold parts used in the final stage of manufacture, namely, the chassis cover.

The templates 12, 22 and 26 can be used as follows to facilitate flexible parts picking and/or assembly of 1u computers. For each custom assembly ordered, a pick list is generated listing the required parts and, preferably, the templates 12, 22, 26 in which they belong. Stock room personnel reference the pick list, filling and stacking the templates in the box 28, such that the template (26) containing the parts to be used at the end of the assembly process are placed at the bottom (and, hence, will be used last by the assembly line workers) and the template (22) containing parts to be used at the beginning of assembly are placed at the top (and, hence, will be used first). For example, stock room personnel can fill and stack (1) the required chassis cover into template 26;
(2) the required data drive(s), power supply, fan assembly, and miscellaneous components into template 12; and
(3) the required multilayer circuit board, processor, memory, heat pipes, and chassis base (with associated accessories) into template 22.

The box is routed to the assembly line, whence workers begin the assembly process with the parts provided in the topmost template and proceed through the bottom template. For example, sequentially at the respective stations, assemblers can remove and build (1) the chassis base, multilayer circuit board, processor, memory, and heat pipes from template 22;
(2) the data drive(s), power supply, fan assembly, and miscellaneous components from template 12; and finally
(3) the chassis cover from template 26.

A further appreciation of the templates shown in FIGS. 3–5 may be attained by reference to the Appendix hereto, which provides schematics for those templates and shows templates, for example, having laminate pads, blocks and supports.

Described herein are methods and apparatus meeting the above-mentioned objects. It will be appreciated that the embodiments described herein are merely examples of the invention and that other embodiments, incorporating modifications and combinations of those described herein, fall within the scope of this invention.

What is claimed is:

1. A kit for facilitating computer manufacture, the kit comprising:
   a plurality of templates, each template defining a plurality of cavities, said cavities including one of silhouettes, impressions, contours, or profiles said cavities contain computer parts corresponding to a respective phase of a fixed or flexible computer manufacturing process, where each cavity is shaped to visually identify each corresponding computer part;
   the plurality of templates including:
   a first template defining a cavity corresponding to a geometry of a computer chassis, the cavity of the first template containing the computer chassis;
   a second template defining a plurality of cavities, each of the plurality of cavities corresponding to a geometry of a part of a central processing unit and each of the plurality of cavities containing the respective part of the central processing unit;
   a third template defining a plurality of cavities, each of the plurality of cavities corresponding to a geometry of a hardware element of a computer and each of the plurality of cavities containing the respective hardware element; and
   a fourth template defining a cavity corresponding to a geometry of a cover of the computer chassis, the cavity of the fourth template containing the cover of the computer chassis; and
   the plurality of templates being physically ordered in a sequence corresponding to a sequence of assembly of the parts as used in assembly of the computer in the computer manufacturing process.

2. The kit of claim 1 wherein the second template defining a plurality of cavities defines at least one of a first cavity having a geometry corresponding to a processor with the first cavity containing the processor, a second cavity corresponding to a geometry of a memory with the second cavity containing the memory, a third cavity corresponding to a geometry of a circuit board with the third cavity containing the circuit board, and a fourth cavity corresponding to a geometry of a heat pipe with the fourth cavity containing the heat pipe.

3. The kit of claim 1 wherein the third template defining a plurality of cavities defines at least one of a first cavity having a geometry corresponding to a power supply with the first cavity containing the power supply, a second cavity corresponding to a geometry of a fan assembly with the second cavity containing the fan assembly, and a third cavity corresponding to a geometry of a drive with the third assembly containing the drive.

4. The kit of claim 1 further comprising a container configured to contain the plurality of templates in the sequence used in the manufacturing process.

5. The kit of claim 4 wherein the container contains the plurality of templates such that the first template is configured to be accessed first in the manufacturing process, the second template is configured to be accessed subsequent to the first template in the manufacturing process, the third template is configured to be accessed subsequent to the second template in the manufacturing process, and the fourth template is configured to be accessed subsequent to the third template in the manufacturing process.

6. The kit of claim 4 wherein the container is formed of a conductive material.

7. A kit for facilitating computer manufacture, the kit comprising:
   a plurality of templates, each template defining a plurality of cavities, said cavities including one of silhouettes, impressions, contours, or profiles said cavities contain computer parts corresponding to a respective phase of a fixed or flexible computer manufacturing process, where each cavity is shaped to visually identify each corresponding computer part;
   the plurality of templates including:
   a first template defining a cavity corresponding to a geometry of a computer chassis, the cavity of the first template containing the computer chassis;
   a second template defines a first cavity having a geometry corresponding to a processor, a second cavity corresponding to a geometry of a memory, a third cavity corresponding to a geometry of a circuit board, and a fourth cavity corresponding to a geometry of a heat pipe, the first cavity containing the processor, the second cavity containing the memory, the third cavity containing the circuit board, and the fourth cavity containing the heat pipe;
   a third template defines a first cavity having a geometry corresponding to a power supply, a second cavity corresponding to a geometry of a fan assembly, and a third cavity corresponding to a geometry of a drive, the first cavity containing the power supply, the second cavity containing the fan assembly and the third assembly containing the drive;
   a fourth template defining a cavity corresponding to a geometry of a cover of the computer chassis, the cavity of the fourth template containing the cover of the computer chassis; and
   a conductive container that contains the plurality of templates in a sequence corresponding to the sequence of assembly of the parts used in the manufacturing process such that the first template is configured to be accessed first in the manufacturing process, the second template is configured to be accessed subsequent to the first template in the manufacturing process, the third template is configured to be accessed subsequent to the second template in the manufacturing process, and the fourth template is configured to be accessed subsequent to the third template in the manufacturing process.

* * * * *